United States Patent
Kurita et al.

(10) Patent No.: US 7,032,617 B2
(45) Date of Patent: Apr. 25, 2006

(54) INTAKE AIR CONTROL APPARATUS FOR AN ENGINE

(75) Inventors: Kazuhisa Kurita, Tokyo (JP); Kenji Nakao, Tokyo (JP); Yoshihiko Onishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/765,392

(22) Filed: Jan. 28, 2004

(65) Prior Publication Data

US 2005/0028871 A1    Feb. 10, 2005

(30) Foreign Application Priority Data

Aug. 4, 2003 (JP) .............................. 2003-285756

(51) Int. Cl.
*F16K 37/00* (2006.01)
(52) U.S. Cl. ............ 137/554; 324/207.12; 324/207.21; 324/207.25; 336/84 M
(58) Field of Classification Search ................ 137/554; 324/207.12, 207.21, 207.25; 336/84 M
See application file for complete search history.

(56) References Cited

U.S. PATENT DOCUMENTS

| | | | | |
|---|---|---|---|---|
| 3,602,254 A | * | 8/1971 | Fawkes | 137/554 |
| 4,392,375 A | * | 7/1983 | Eguchi et al. | 137/554 |
| 5,055,781 A | * | 10/1991 | Sakakibara et al. | 324/207.21 |
| 5,148,106 A | * | 9/1992 | Ozawa | 324/207.21 |
| 5,332,965 A | * | 7/1994 | Wolf et al. | 324/207.12 |
| 5,609,184 A | * | 3/1997 | Apel et al. | 137/554 |
| 6,356,073 B1 | * | 3/2002 | Hamaoka et al. | 324/207.25 |
| 6,483,296 B1 | * | 11/2002 | Hamaoka et al. | 324/207.25 |
| 6,741,073 B1 | * | 5/2004 | Iwamoto et al. | 324/207.12 |
| 6,756,780 B1 | * | 6/2004 | Hagio et al. | 324/207.25 |

FOREIGN PATENT DOCUMENTS

JP    2001-132494 A    5/2001

* cited by examiner

*Primary Examiner*—John Rivell
(74) *Attorney, Agent, or Firm*—Sughrue Mion, PLLC

(57) ABSTRACT

An intake air control apparatus for an engine is capable of suppressing the influence of external magnetic flux from outside thereby to prevent a variation in an output of a rotational angle detection sensor due to the external magnetic flux. A permanent magnet is provided on an end portion of a shaft. A rotational angle detection sensor is disposed in a spaced parallel relation with respect to the permanent magnet, and has a magnetoresistive element for detecting a change in direction of a magnetic flux of the permanent magnet thereby to detect a rotational angle of a throttle valve. A bypass member is disposed to enclose the rotational angle detection sensor with its side near the permanent magnet apertured to form an opening surface, the bypass member being made of a magnetic material which is adapted to form a bypass path for the magnetic flux from the permanent magnet.

5 Claims, 4 Drawing Sheets

INTAKE AIR CONTROL APPARATUS FOR AN ENGINE

BACKGROUND OF THE INVENTION

1. Field of the Invention

The present invention relates to an intake air control apparatus for an engine with a rotational angle detection sensor for detecting the rotational angle of a throttle valve that adjusts the degree of opening in an intake passage.

2. Description of the Related Art

In a known intake air control apparatus for an conventional engine, there has been used a flux density detection type sensor provided with a Hall element as a sensor for detecting the rotational angle of a throttle valve fixedly secured to a shaft.

That is, a cylindrical measuring target, which has a magnetic circuit constructed by a permanent magnet and a magnetic member, is mounted on a sector-shaped final spur gear fixedly secured to a shaft which is driven to rotate by a drive motor, and a Hall element is arranged on the central axis of the measuring target, so that the Hall element can detect a change in the density of flux passing therethrough in accordance with the rotation of the measuring target operably connected with the final spur gear thereby to detect the rotational angle of the throttle valve (for example, see a first patent document: Japanese patent laid-open No. 2001-132494 (FIG. 1)).

In the intake air control apparatus for an engine as described above, the sensor for detecting the rotational angle of the throttle valve is arranged in the neighborhood of the drive motor that drives the shaft to rotate. With such an arrangement, there arises the following problem: that is, the sensor is subjected to the influence of the magnetic flux generated by the drive motor, and hence its output becomes unstable, so that the rotational angle of the throttle valve can not be accurately detected, resulting, for example, in a situation that a required amount of intake air can not be obtained.

To cope with such a situation, it is considered that the influence of magnetic flux from the drive motor is suppressed by enclosing the Hall element with a magnetic member. However, in the above-mentioned intake air control apparatus for an engine, the Hall element is arranged on the central axis of the measuring target, so the Hall element receives the magnetic flux of a permanent magnet from therearound. As a result, there arises another problem as stated below: that is, when the Hall element is enclosed with the magnetic member, it becomes impossible for the Hall element to accurately detect a change in the density of flux passing therethrough in accordance with the rotation of the measuring target.

SUMMARY OF THE INVENTION

Accordingly, the present invention is intended to obviate the above-mentioned various problems, and has for its object to provide an intake air control apparatus for an engine which is capable of suppressing the influence of external magnetic flux from the outside thereby to prevent a variation in the output of a rotational angle detection sensor due to the external magnetic flux.

Bearing the above object in mind, the present invention resides in an intake air control apparatus for an engine which includes: a shaft; a throttle valve fixedly secured to the shaft for adjusting the degree of opening in an intake passage through a rotational angle thereof; and a permanent magnet provided on an end portion of the shaft with its N pole and S pole being positioned in a diametral direction thereof. The apparatus further includes: a rotational angle detection sensor disposed in a spaced parallel relation with respect to the permanent magnet, and having a magnetoresistive element for detecting a change in direction of a magnetic flux of the permanent magnet thereby to detect a rotational angle of the throttle valve; and a bypass member disposed to enclose the rotational angle detection sensor with its side near the permanent magnet apertured to form an opening surface, the bypass member being made of a magnetic material which is adapted to form a bypass path for the magnetic flux from the permanent magnet.

In the intake air control apparatus for an engine as constructed above according to the present invention, the influence of external magnetic flux from the outside can be suppressed, whereby a variation in the output of the rotational angle detection sensor resulting from the external magnetic flux can be prevented in a reliable manner.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, reference will be first made to an intake air control apparatus for an engine (hereinafter referred to as an intake air control apparatus) according to a first embodiment of the present invention.

Figure 1:
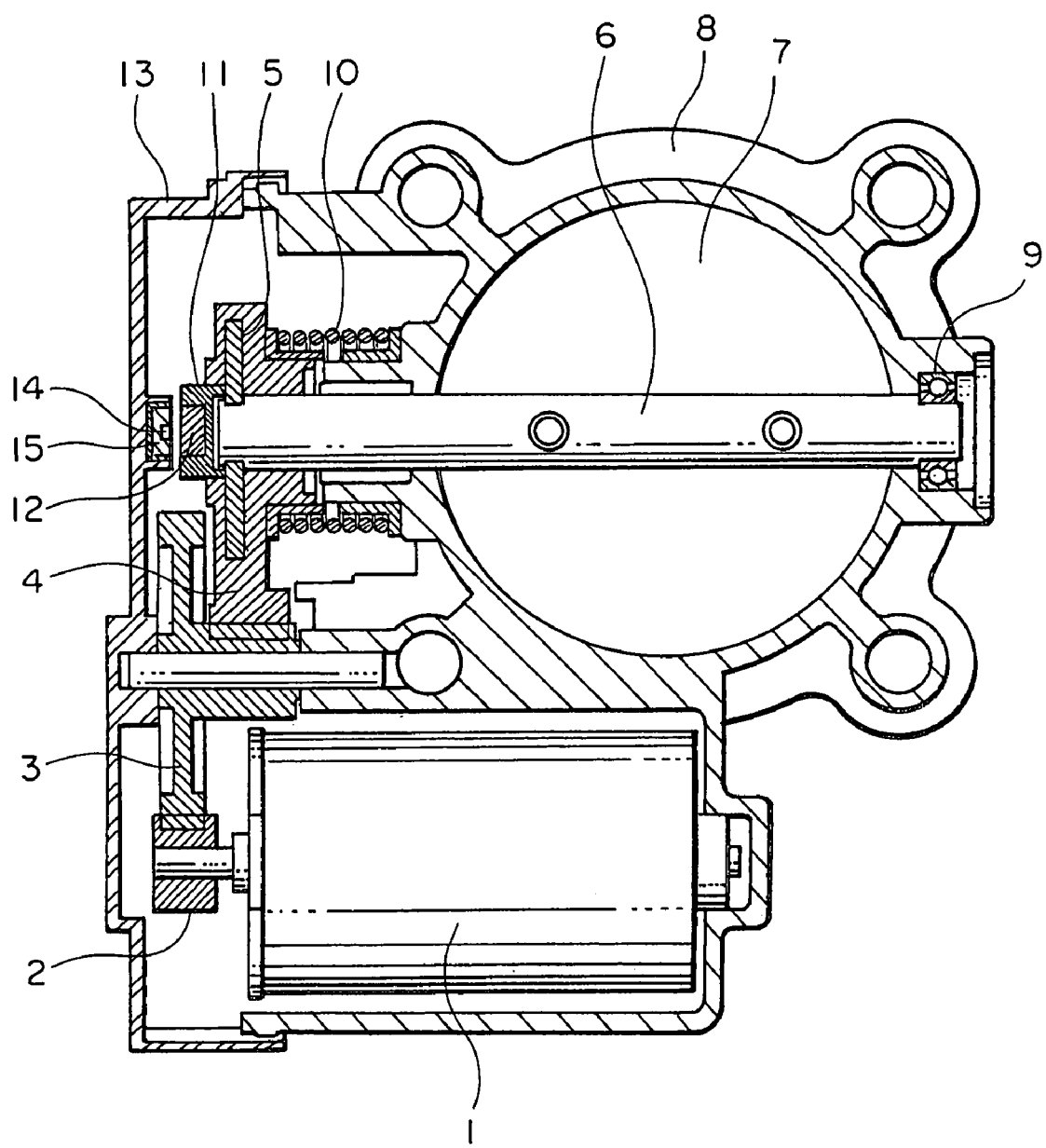
FIG. 1 is a cross sectional side view of an intake air control apparatus for an engine according to a first embodiment of the present invention.
Figure 2:
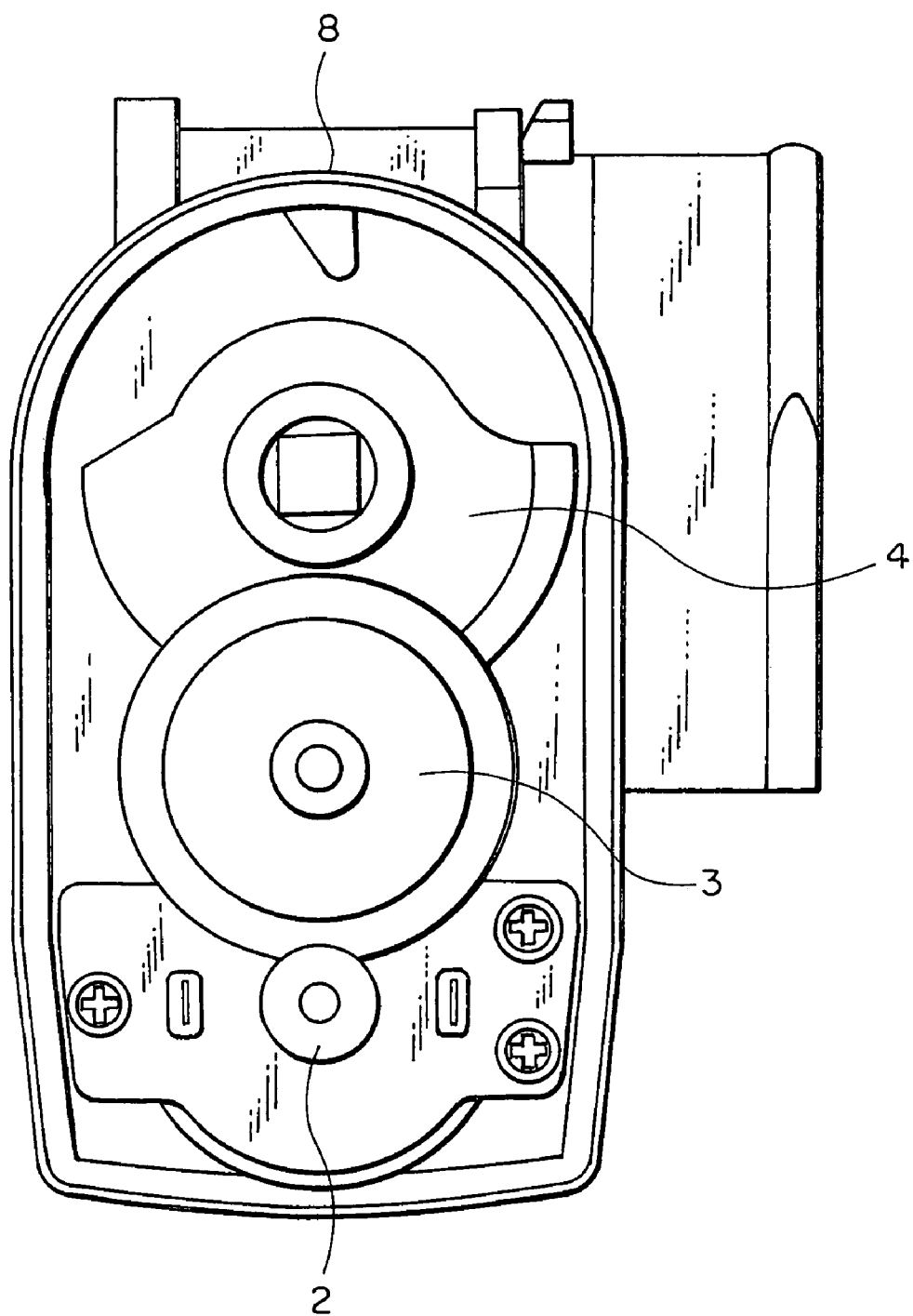
FIG. 2 is a left side view of the intake air control apparatus with a cover of FIG. 1 being removed.

FIG. 1 is a cross sectional side view of this intake air control apparatus, and FIG. 2 is a left side view of the intake air control apparatus with a cover of FIG. 1 being removed.

This intake air control apparatus includes a drive motor 1 adapted to be driven by a direct current, a motor spur gear 2 fixedly mounted on a rotating shaft of the drive motor 1, an intermediate gear 3 made of resin and being arranged in meshing engagement with the motor spur gear 2, a final spur gear 4 of a sector-shaped configuration made of resin and being arranged in meshing engagement with the intermediate gear 3, a disk-shaped plate 5 made of steel and being embedded in the final spur gear 4, a shaft 6 having the final spur gear 4 fixedly mounted thereon at one end thereof and being rotatably supported at its other end by a body 8 through a bearing 9, a throttle valve 7 attached by screws to the shaft 6 for adjusting the flow rate of intake air, and a coiled return spring 10 arranged on the outer periphery of the shaft 6 for returning the throttle valve 7 to an initial position thereof when the engine is at idle rotational speed. The plate 5 is fixedly secured by caulking to the shaft 6, and the final spur gear 4 is integrally coupled with the plate 5 by insert molding.

Also, the intake air control apparatus further includes a receiving portion 11 fixedly attached to an end face of the shaft 6 at a side near the final spur gear 4, a permanent magnet 12 fitted into the receiving portion 11, and a rotational angle detection sensor 14 (hereinafter simply referred to as a sensor) that is arranged in a spaced parallel relation to the permanent magnet 12 and has a magnetoresistive element of the magnetic flux azimuth detection type, and a bypass member 15 of a bottomed cylindrical shape arranged so as to enclose the sensor 14 with its opening directed toward the permanent magnet 12, the bypass member being made of a magnetic material that serves to form a bypass path for the magnetic flux from the permanent magnet 12.

The permanent magnet 12 is arranged in such a manner as to have its polarity of an N pole and an S pole oriented in a radial direction of the shaft 6. The permanent magnet 12 is of a hexahedral shape, and its flux density with respect to the sensor 14 is adjusted by a distance between the permanent magnet 12 and the sensor 14.

Figure 5:
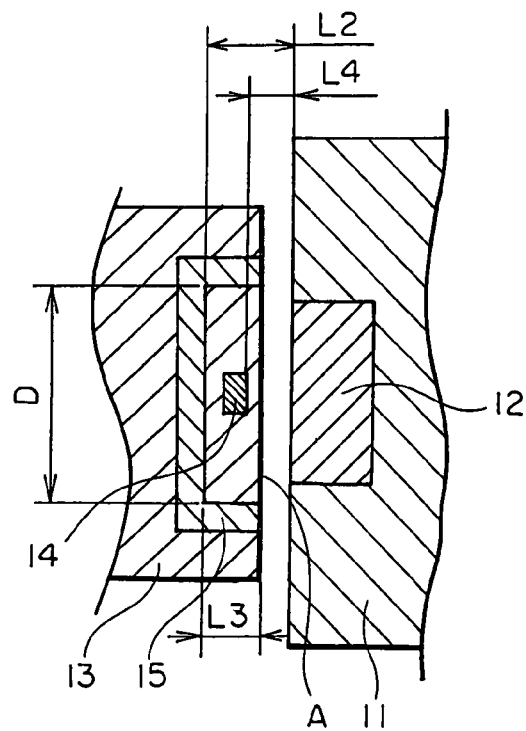
FIG. 5 is a view explaining the positional relation between the permanent magnet, a magnetoresistive element and a bypass member in FIG. 1, as viewed from a diametrical direction of the shaft.
Figure 6:
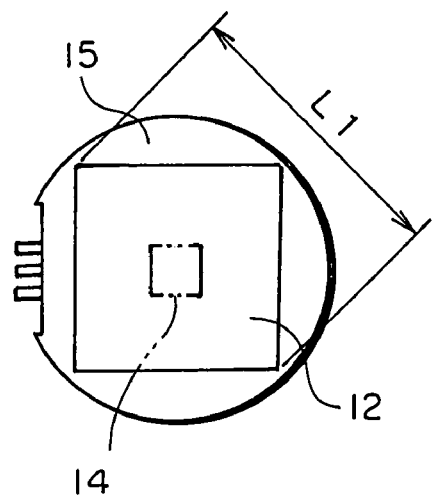
FIG. 6 is a view explaining the positional relation between the permanent magnet and the magnetoresistive element in FIG. 1, as viewed from the axial direction of the shaft.

FIG. 5 and FIG. 6 are views that show the positional or arrangement relation among the permanent magnet 12, the sensor 14 and the bypass member 15. The permanent magnet 12 is arranged at an inner side of the bypass member 15, as viewed from an axial direction of the shaft 6. In addition, the sensor 14 is also arranged at the inner side of the bypass member 15 at a location offset from the center thereof toward the permanent magnet 12. For example, dimensions in such an arrangement are set as follows: a distance L2 between an inner surface of the bottom of the cylindrical bypass member 15 and an outer or exposed surface of the permanent magnet 12 is 4–6 mm; a distance L4 between an inner face of the sensor 14 and the outer surface of the permanent magnet 12 is 1.5–2.5 mm; a diagonal length L1 of a square or rectangular cross section of the permanent magnet 12 is 5–10 mm; an inner diameter D of the bypass member 15 is 8–16 mm; and a depth L3 of the cylindrical bypass member 15 (i.e., the length between the bottom inner surface and the peripheral outer end face thereof) is 2–3 mm.

In the intake air control apparatus as constructed above, when the driver depresses an accelerator pedal, a signal representative of the opening (i.e., the amount of depression) of the accelerator pedal is input from an accelerator opening sensor (not shown) to the ECU. The ECU energizes the drive motor 1 so that the output or rotating shaft of the drive motor 1 is driven to rotate so as to move the throttle valve 7 to a prescribed degree of opening. That is, in accordance with the rotation of the output shaft of the drive motor 1, the intermediate gear 3 and the final spur gear 4 are rotated whereby the shaft 6 integral with the final spur gear 4 is driven to rotated through a prescribed rotational angle. As a result, the throttle valve 7 is rotated to and held at the prescribed rotational angle in an intake passage formed in the body 8.

On the other hand, the sensor 14 detects the azimuth of magnetic flux lines emerging from the permanent magnet 12 that is rotating integrally with the shaft 6, and sends an opening signal representative of the degree of opening of the throttle valve 7 from the sensor 14 to the ECU. Based on this opening signal, the ECU determines how much fuel to inject into the cylinders of the engine.

Figure 3:
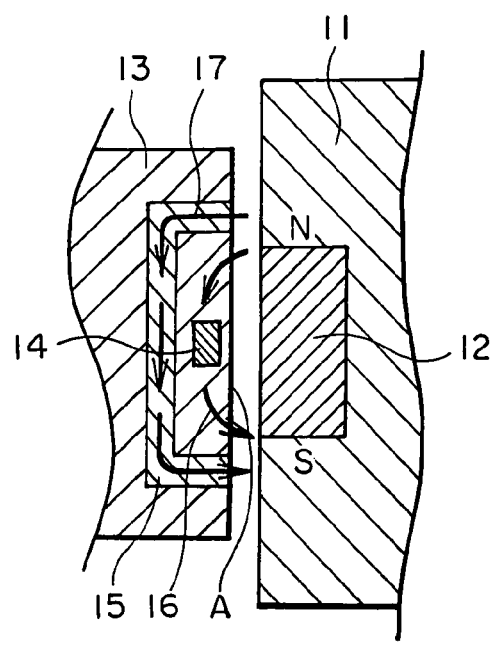
FIG. 3 is an enlarged view of essential portions of FIG. 1.
Figure 4:
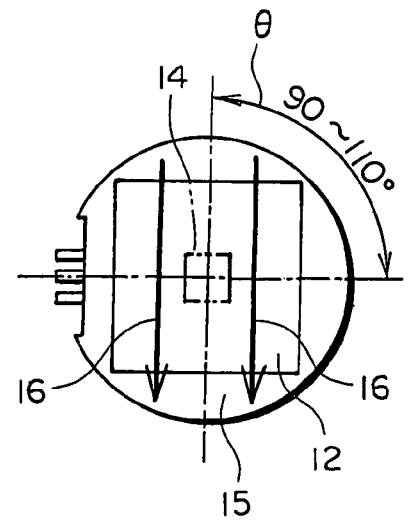
FIG. 4 is a view of the flow of magnetic flux of a permanent magnet of FIG. 1, as viewed from an axial direction of a shaft.

In the intake air control apparatus as constructed above, the sensor 14 of the magnetic flux azimuth detection type receives the flow of magnetic flux 16 from the permanent magnet 12, as shown in FIG. 3, and the sensor 14 generates an output signal which varies within a working range θ of the magnetic flux in accordance with the azimuth or direction of the magnetic flux, as shown in FIG. 4. More specifically, the working range θ of the magnetic flux is from 0°, at which the throttle valve 7 is fully closed, to 90°–110° at which the throttle valve 7 is fully opened, and the sensor 14 has a linear response within this range.

The positional relation between the permanent magnet 12 and the sensor 14 is such that the permanent magnet 12 is arranged on the axis of the shaft 6, and the sensor 14 is also arranged on the axis of the shaft 6 in a spaced parallel relation with respect to the permanent magnet 12. As a result, in comparison with the prior art in which it is necessary to accurately arrange a sensor at the center of a cylindrical measuring target, assembly accuracies of the permanent magnet 12 and the sensor 14, respectively, are relaxed or eased, and hence the manufacturing cost of the entire apparatus can be reduced.

This means the accuracy of assembling the cover 13, which is integrally formed or coupled with the sensor 14 by insert molding, to the body 8 and the accuracy of assembling the final spur gear 4 to the shaft 6 are relaxed or eased. As a consequence, even resins, which are liable to be affected by dimensional changes due to atmospheric temperature and water absorption, can be used as materials for the cover 13 and the final spur gear 4.

Moreover, the bypass member 15 is disposed to enclose the sensor 14 with its side near the permanent magnet 12 apertured to form an opening surface A, as shown in FIG. 3. Accordingly, a flow of magnetic flux 17, which passes through a magnetic path formed by the bypass member 15, is generated together with the flow of magnetic flux 16 passing through the sensor 14, by means of the permanent magnet 12. As a result, external magnetic flux, when going to flow into the sensor 14 from the outside, is absorbed by the flow of magnetic flux 17 that is passing through the magnetic path in the bypass member 15 located outside of the flow of magnetic flux 16 passing through the sensor 14, whereby the influence of the external magnetic flux on the sensor 14 can be suppressed.

Further, the magnetic flux, which is created by the permanent magnet 12 and is going to leak outside, flows into the bypass member 15, and hence an outside leakage thereof is also suppressed.

Furthermore, since the bypass member 15 is formed of low-carbon steel, which is a magnetic material, the bypass member 15 has good machinability and can be fabricated at low cost.

Embodiment 2

Figure 8:
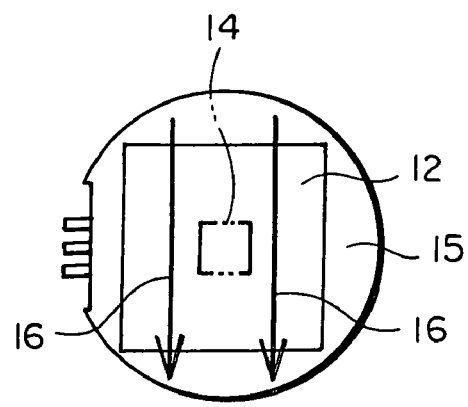
FIG. 8 is a view of the flow of magnetic flux of a permanent magnet of FIG. 7, as viewed from an axial direction of a shaft.
Figure 7:
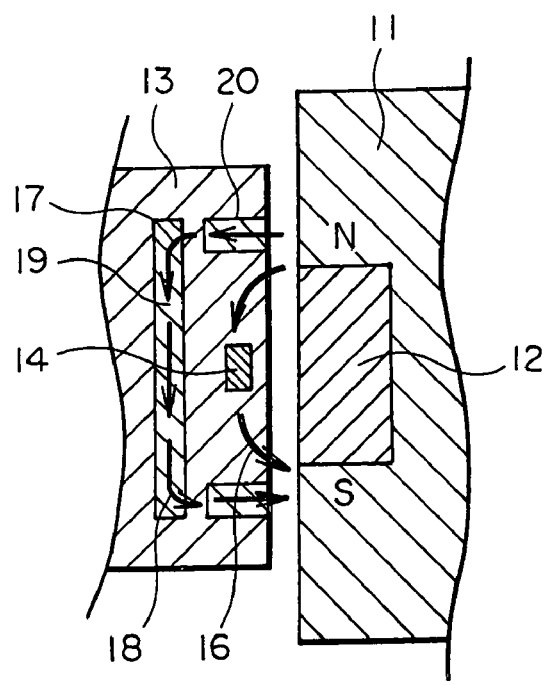
FIG. 7 is a cross sectional view of essential portions of a intake air control apparatus for an engine according to a second embodiment of the present invention.

FIG. 7 is a cross sectional view of essential portions of an intake air control apparatus for an engine according to a second embodiment of the present invention, and FIG. 8 is a view showing the flow of magnetic flux from a permanent magnet 12 in FIG. 7 when viewed in an axial direction of a shaft 6.

In this embodiment, a bypass member 18 is composed of two members, i.e., a disk-shaped bottom member 19 and a cylinder member 20 of a hollow cylindrical shape that is disposed between the bottom member 19 and the permanent magnet 12 so as to extend from the former toward the latter.

The bottom member 19 and the cylinder member 20 can be respectively arranged at arbitrary locations, and hence the degree of freedom of their arrangement can be increased, thus making it possible to further reduce the waste of the magnetic flux of the permanent magnet 12. In addition, the influence of external magnetic flux on the sensor 14 can also be further suppressed, thereby contributing to the reduction in size and cost of the permanent magnet 12.

Although the above-mentioned respective embodiments, description has been made by using a magnetoresistive element as a rotational angle detection sensor, a giant magnetoresistive element may instead be employed for the same purpose.

Further, the shape of the bypass member 15 is not limited to a bottomed cylindrical configuration, but other shapes such as, for example, a bottomed quadrangle or the like may be acceptable.

While the invention has been described in terms of preferred embodiments, those skilled in the art will recognize that the invention can be practiced with modifications within the spirit and scope of the appended claims.

What is claimed is:

1. An intake air control apparatus for an engine comprising:
    a shaft;
    a throttle valve fixedly secured to said shaft for adjusting the degree of opening in an intake passage through a rotational angle thereof;
    a permanent magnet provided on an end portion of said shaft with its N pole and S pole being positioned in a diametral direction thereof;
    a rotational angle detection sensor disposed in a spaced parallel relation with respect to said permanent magnet, and having a magnetoresistive element for detecting a change in direction of a magnetic flux of said permanent magnet thereby to detect a rotational angle of said throttle valve; and
    a bypass member disposed to enclose said rotational angle detection sensor with its side near said permanent magnet apertured to form an opening surface, said bypass member being made of a magnetic material which is adapted to form a bypass path for the magnetic flux from said permanent magnet.

2. The intake air control apparatus for an engine as set forth in claim 1, wherein said bypass member is arranged in such a manner that said permanent magnet is disposed at an inner side of said bypass member when viewed in the axial direction of said shaft.

3. The intake air control apparatus for an engine as set forth in claim 1, wherein said magnetoresistive element is disposed at a location offset from said opening surface toward a bypass member side.

4. The intake air control apparatus for an engine as set forth in claim 1, wherein said bypass member is composed of two members comprising a bottom member, and a cylinder member extending from said bottom member toward said permanent magnet.

5. The intake air control apparatus for an engine as set forth in claim 1, comprising a body having said intake passage formed therein to receive said shaft and said throttle valve, said body being adapted to be closed by a cover, wherein said rotational angle detection sensor is integrally formed with said cover by insert molding.

* * * * *